United States Patent [19]

Ogawa

[11] Patent Number: 5,209,426
[45] Date of Patent: May 11, 1993

[54] MAGNETIC TAPE CASSETTE WITH A PLURALITY OF INDEPENDENTLY MOVABLE PROTECTIVE PLATE MEMBERS

[75] Inventor: Kimio Ogawa, Yokohama, Japan

[73] Assignee: Victor Company of Japan, Ltd., Yokohama, Japan

[21] Appl. No.: 720,992

[22] Filed: Jun. 26, 1991

[30] Foreign Application Priority Data

Jun. 27, 1990 [JP] Japan .................. 2-68047[U]
Jun. 28, 1990 [JP] Japan .................. 2-69197[U]

[51] Int. Cl.⁵ .............................................. G11B 23/08
[52] U.S. Cl. .................................. 242/199; 242/198
[58] Field of Search ............... 360/132; 242/199, 198

[56] References Cited

U.S. PATENT DOCUMENTS

| 4,418,373 | 11/1983 | Fujimori et al. | 242/199 X |
| 4,607,308 | 8/1986 | Tsurata et al. | 360/132 |
| 4,698,713 | 10/1987 | Kawada | 360/132 |
| 4,844,377 | 7/1989 | Shiomi et al. | 242/199 X |
| 4,885,651 | 12/1989 | Shiba et al. | 360/132 |
| 4,897,751 | 1/1990 | Goto | 360/132 |

FOREIGN PATENT DOCUMENTS

| 0052479 | 5/1982 | European Pat. Off. | |
| 0100281 | 6/1983 | Japan | 360/132 |
| 0200477 | 11/1983 | Japan | 360/132 |
| 58-199479 | 3/1984 | Japan . | |
| 59-168979 | 9/1984 | Japan . | |
| 0113382 | 6/1985 | Japan | 360/132 |
| 121580 | 6/1985 | Japan | 360/132 |
| 60-106088 | 10/1985 | Japan . | |
| 60-107780 | 10/1985 | Japan . | |
| 0034393 | 2/1987 | Japan | 360/132 |
| 0150781 | 6/1991 | Japan | 360/132 |
| 2102386 | 6/1981 | United Kingdom | 360/132 |

Primary Examiner—Daniel P. Stodola
Assistant Examiner—John Rollins
Attorney, Agent, or Firm—Lowe, Price, LeBlanc & Becker

[57] ABSTRACT

In a magnetic tape cassette of the type having an upper shell, a lower shell and a pivotable guard panel assembled together to hold therein a magnetic tape wound on a pair of tape reels, a mouth is provided in said lower shell along a front side of said tape cassette for receiving therein a loading pole for withdrawing a segment of the magnetic tape from said tape cassette, and a protective plate is pivotably mounted on said lower shell behind said guard panel and is cooperative with said guard panel to enclose the segment of the magnetic tape for protecting the latter against damage. The protective plate is pivotally movable within the mouth independently from the guard panel and hence it does not increase a maximum height of the tape cassette when the guard panel is disposed in the open position. The protective plate is lockingly engageable with the guard panel to hold the latter in the closed position against displacement. A plurality of independently movable plate members compose the protective plate.

9 Claims, 6 Drawing Sheets

MAGNETIC TAPE CASSETTE WITH A PLURALITY OF INDEPENDENTLY MOVABLE PROTECTIVE PLATE MEMBERS

BACKGROUND OF THE INVENTION

1. Field of the Invention

The present invention relates to a magnetic tape cassette particularly suitable for use in magnetic recording and/or reproducing apparatus such as video tape recorders.

2. Description of the Prior Art

In general, magnetic tape cassettes of the type concerned include a housing composed of an upper shell and a lower shell assembled together to contain a length of a magnetic tape wound on a pair of reels. The magnetic tape is protected by a guard panel except when the tape cassette is loaded in a magnetic recording and/or reproducing apparatus such as a video tape recorder. One such known magnetic tape cassette is disclosed in Japanese Patent Laid-open Publication No. 59-168979.

The disclosed tape cassette includes a front lid and a rear lid normally disposed on opposite sides of a segment of the magnetic tape extending across the front side of the tape cassette, so as to enclose and thereby protect the magnetic tape against damage. The rear lid is integrally formed with a generally T-shaped top cover and includes a pair of pivot pins connected to the front lid, a pair of support arms and a pair of guide pins formed on the support arms, respectively, for pivotal movement of the rear lid relative to the tape cassette. The rear lid thus constructed has a complicated configuration. In addition, the lower shell has a pair of guide grooves in which the guide pins on the rear lid are slidably received.

The front and rear lids are pivotally movable between a closed position in which they enclose the magnetic tape in the manner described above, and an open position in which they are superposed one upon another on the upper shell. With this superposed arrangement, the maximum operational height of the tape cassette (namely, the distance from the under surface of the lower shell to a highest part of the front lid) is 1.5 times as large as the distance between the under surface of the lower shell and the upper surface of the upper shell. The tape cassette having such a large operational height is disadvantageous because a higher video tape recorder is needed.

When the front and rear lids are disposed in the closed position, the front lid is locked in position against displacement by a lock lever resiliently urged by a torsion coil spring. When the tape cassette is loaded in the video tape recorder, an unlock member abuts against a releasing projection on the lock lever to turn the lock lever against the force of the torsion coil spring, thereby unlocking the front lid. At the same time, a lid opening member lifts the front lid up until the front lid and the rear lid connected thereto turn in an open direction through an angle of about 90 degrees against the force of the torsion coil spring, thereby opening a front recessed portion or mouth across which a segment of the magnetic tape extends.

The lock lever and the torsion coil spring, which are provided to lock the front and rear lids in the closed position against accidental exposure of the magnetic tape, increase the number of structural components of the tape cassette and make a lid locking mechanism complicated in construction.

SUMMARY OF THE INVENTION

With the foregoing drawbacks of the prior art in mind, it is an object of the present invention to provide a magnetic tape cassette which includes a structurally simple protective plate cooperating with a guard panel to protect a magnetic tape against damage when the tape cassette is not used, has a small operational height when the guard panel is open, and is capable of locking the guard panel in the closed position with a simple and compact guard panel locking mechanism.

Another object of the present invention is to provide a magnetic tape cassette including a protective plate which is resistant to bending forces and deformation and is well adaptable to a recessed portion or mouth having a complicated configuration.

According to the present invention, there is provided a magnetic tape cassette of the type having an upper shell and a lower shell assembled together to hold therein a magnetic tape wound on a pair of tape reels, and a guard panel pivotally mounted on the tape cassette and pivotally movable between an open position in which a segment of the magnetic tape extending across a front side of the tape cassette is exposed, and a closed position in which the tape segment is enclosed in the tape cassette, the guard panel being normally disposed in the closed position. The improvement comprises: a mouth provided in the lower shell for receiving therein a loading pole for withdrawing a segment of the magnetic tape from the tape cassette; and a protective plate pivotably mounted on the lower shell behind the guard panel and cooperating with the guard panel to enclose the segment of the magnetic tape for protecting the latter against damage.

The protective plate is pinned to the lower shell and hence is simple in construction. In addition, the protective plate is pivotally movable within the mouth and hence it does not increase a maximum height of the tape cassette when the guard panel is disposed in the open position.

Preferably, the protective plate is engageable with the guard panel to lock the guard panel in the closed position.

The above and other objects, features and advantages of the present invention will become more apparent from the following description when making reference to the detailed description and the accompanying sheets of drawings in which preferred structural embodiments incorporating the principles of the present invention are shown by way of illustrative examples.

DETAILED DESCRIPTION OF THE PREFERRED EMBODIMENTS

Figure 1:
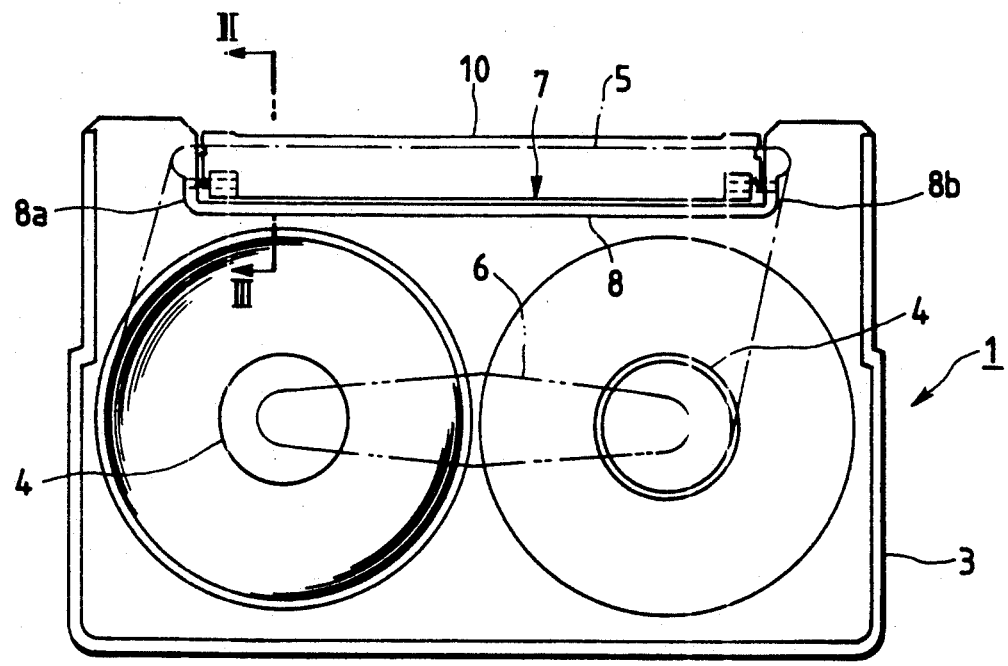
FIG. 1 is a diagrammatical plan view, with an upper part removed for clarity, of a magnetic tape cassette according to one embodiment of this invention.

The present invention will be described in greater detail with reference to certain preferred embodiments shown in the accompanying drawings in which like reference characters designate like or corresponding parts throughout the several views.

Figure 4:
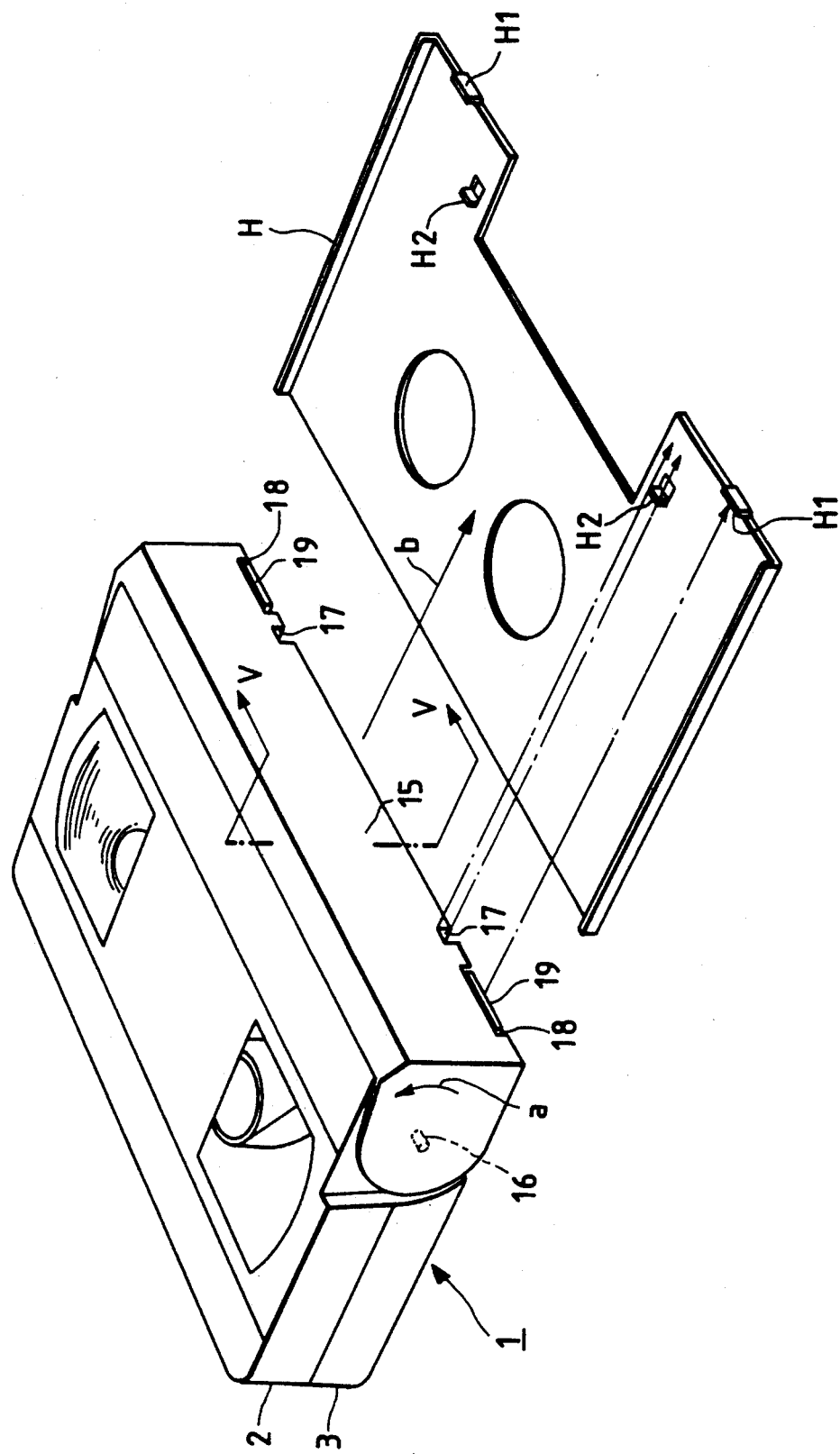
FIG. 4 is a schematic perspective view of the magnetic tape cassette and a cassette holder of the magnetic recording and/or reproducing apparatus.

As shown in FIGS. 1 and 4, a magnetic tape cassette 1 includes an upper shell 2 (FIG. 4) and a lower shell 3 assembled together to hold therein a pair of tape reels 4, 4 on which a length of a magnetic tape 5 is wound. The tape cassette 1 further contains a leaf spring 6 (FIG. 1) acting between the upper shell 2 and the tape reels 4, 4 to urge the tape reels 4, 4 toward the lower shell 3.

The lower shell 3 has a generally flattened U-shaped recessed portion or mouth 7 at the front side thereof across which a segment of the magnetic tape 5 extends. The mouth 7 is receptive of at least one loading pole of a tape deck (neither shown) which is operative to withdraw a segment of the magnetic tape 5 from the tape cassette 1 in the upward direction in FIG. 1. To this end, one side of the mouth 7 (upper side in FIG. 1) is open for the passage therethrough of the magnetic tape 5.

The sides of the mouth 7 other than the open upper side are surrounded by a generally U-shaped inside wall 8. The U-shaped inside wall 8 includes a pair of opposed side walls 8a, 8b to which a protective plate 10 is pivotably pinned or hinged.

Figure 2B:
FIG. 2(b) is a side view of the protective plate.
Figure 2A:
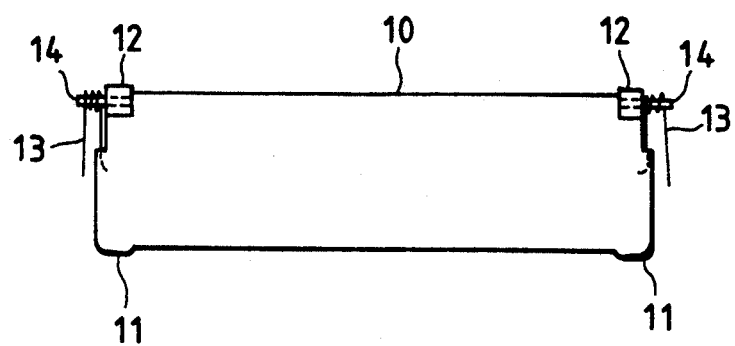
FIG. 2(a) is a plan view of a protective plate of the magnetic tape cassette.

The protective plate 10, as shown in FIG. 2(a), is an elongate rectangular plate having a pair of locking projections 11, 11 at opposite ends of a lower side edge, and a pair of hollow cylindrical pin retainers 12, 12 at opposite ends of an upper side edge. A pair of torsion coil spring 13, 13 is associated with the pin retainers 12, 12, respectively.

Figure 3:
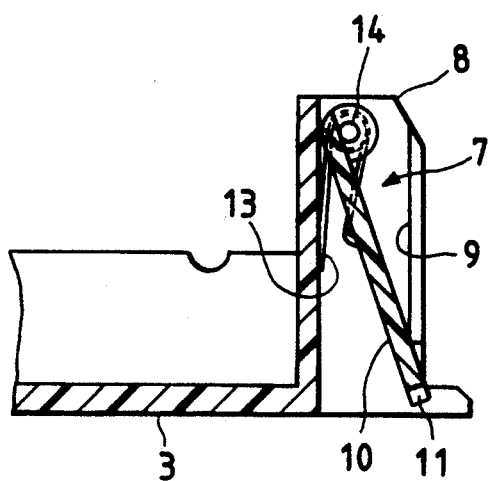
FIG. 3 is an enlarged cross-sectional view taken along line III—III of FIG. 1.

The protective plate 10 is pivotally connected to the inside wall 8 of the mouth 7 adjacent to an upper edge thereof by means of a pair of pins 14, 14 slidably received in the corresponding pin retainers 12, 12 and the inside wall 8, with coiled portions of the torsion coil springs 13 extending loosely around the pins 14, 14. The protective plate 10 is urged by the torsion coil springs 13 to turn in the counterclockwise direction in FIG. 3 about the pins 14. The counterclockwise angular movement of the protective plate 10 is limited by a stopper 9 projecting from the inside wall 8 of the mouth 7.

As depicted in FIG. 4, a guard panel or lid 15 for covering the front surface of the tape cassette 1 is pivotably mounted on the tape cassette 1 by a pair of pins 16 (one being shown) connected to opposite side walls of the tape cassette 1 in the vicinity of a mating surface between the upper and lower shells 2, 3. The guard panel 15 is movable in the direction of the arrow a between open and closed mode positions. The guard panel 15 has in its lower edge a pair of spaced first cutout recesses 17, 17 and a pair of spaced second cutout recesses 18, 18 located at the outside of the first cutout recesses 17, 17. The first cutout recesses 17, 17 correspond in position to the position of the locking projections 11, 11 (FIG. 2(a)) on the protective plate 10, while the second cutout recesses 18, 18 receive respectively therein a pair of positioning ridges 19, 19 which projects from the lower shell 3 of the tape cassette 1 for positioning the tape cassette 1 relative to the cassette holder H in the direction of the depth of the tape cassette 1.

Figure 5:
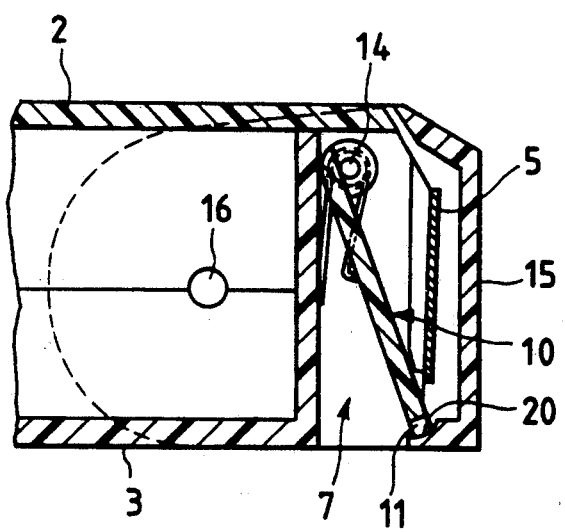
FIG. 5 is an enlarged cross-sectional view taken along line V—V of FIG. 4.

The guard panel 15 has a horizontal U-shaped corss-section, as shown in FIG. 5 and includes a lower side bent inwardly (leftward in this figure) and terminating in a locking step 20 which is held in interlocking engagement with the locking projections 11 of the protective plate 10. Thus, a segment of the magnetic tape 5 extending across the mouth 7 (FIG. 1) is enclosed by and between the guard panel 15 and the protective plate 10 and hence is protected against damage. The protective plate 10 having such locking projections 11 also serves as a locking means or mechanism for locking the guard panel 15 in the closed position shown in FIG. 5.

The operation of the guard panel locking mechanism will be described below with reference to FIG. 6.

When the guard panel 15 turns about the pins 16, the front end A of the locking step 20 of the guard panel 15 angularly moves along a first arcuate path R1. On the other hand, when the protective plate 10 turns about the pins 14, an outer edge B of the locking projections 11 of the protective plate 10 angularly move along a second arcuate path R2.

Figure 6:
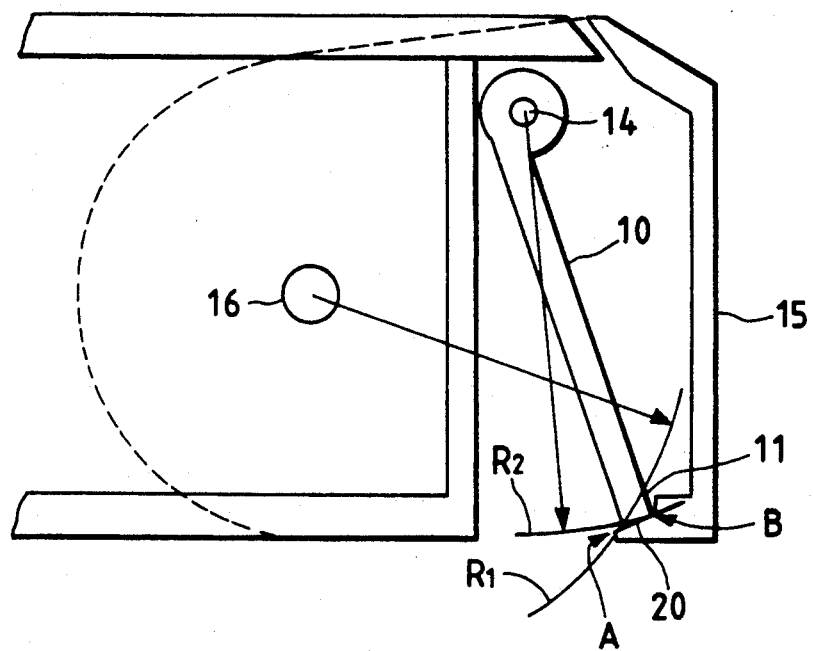
FIG. 6 is an enlarged diagrammatical explanatory view illustrative of the operation of a guard panel lock mechanism of the tape cassette.

As appears clear from FIG. 6, the second arcuate path R2 of the movement of the front end A of the locking step 20 is located on the inner side of the outer edge B of each locking projection 11, With this arrangement, when the guard panel 15 is subjected to an external force tending to move the guard panel 15 counterclockwise about the pins 16 into the open position, the locking step 20 is caught by the locking projections 11 so that the guard panel 15 is stably locked in the closed position.

The locking step 20 is tapered toward the front end A so as not to interfere with the path R2 of movement of the outer edge 8 of the locking projections 11. Consequently, the protective plate 10 is movable in the clockwise direction about the pins 14 without obstruction.

With the guard panel locking mechanism thus constructed, the protective plate 10 is pivotally movable when the guard panel 15 is disposed in the closed position, whereas the guard panel 15 is prevented from moving toward its open position as long as it is held in interlocking engagement with a distal end of the protective plate 10. This operational interlocking relation results from the relative position of an axis of rotation (i.e., the pins 16) of the guard panel 15 and an axis of rotation (i.e., the pins 14) of the protective plate 10 that are out of alignment with each other.

Then, the operation of the magnetic tape cassette I will be described below with reference to FIG. 4 and FIGS. 7(a) and 7(b).

When the magnetic tape cassette 1 is to be loaded in a video tape deck, for example, the tape cassette 1 is forced on and along a flat holder H of the video tape deck in the direction of the arrow b. The holder H includes a pair of laterally spaced stopper lugs H1, H1 at its rear side edge, and a pair of laterally spaced actuating lugs H2, H2 near the rear side edge. The stopper lugs H1, H1 correspond in position to the position of the second cutout recesses 18 in the guard panel 15, while the actuating lugs H2, H2 correspond in position to the position of the first cutout recesses 17 in the guard panel 15.

As the tape cassette 1 advances, the first cutout recesses 17, 17 in the guard panel 15 pass over the actuating lugs H2, H2 and then the positioning ridges 19, 19 abut against the stopper lugs H1, H1 whereby the tape cassette 1 is positioned relative to the cassette holder H in the direction of the depth of the tape cassette 1.

Figure 7A:
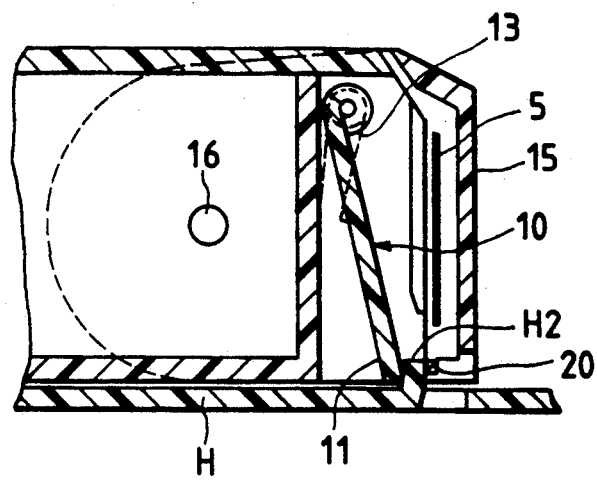
FIGS. 7(a) and 7(b) are cross-sectional views showing the manner in which the guard panel and the protective plate operate.

During the advancing movement of the tape cassette 1 stated above, the actuating lugs H2, H2 are brought into engagement with the locking projections 11, 11 of the protective plate 10 and then turn the protective plate 10 clockwise against the force of the torsion springs 13, as shown in FIG. 7(a). Thus, the locking projections 11, 11 are disengaged from the locking step 20 of the guard panel 15.

Figure 7B:
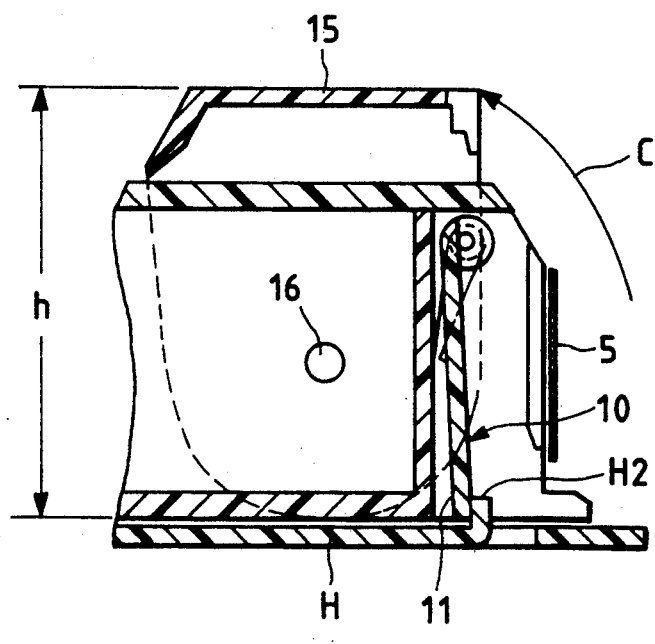

A further advancing movement of the tape cassette 1 causes the actuating lugs H2, H2 to turn the protective plate 10 into a substantially vertical position shown in FIG. 7(b). During that time, the guard panel 15 is turned by a guard panel actuating means (not shown) in the counter-clockwise direction indicated by the arrow c about the pins 16 through an angle of 90 degrees, so that a segment of the tape 5 extending across the mouth 7 (FIG. 1) is exposed for withdrawal from the tape cassette 1.

As appears clear from FIG. 7(b), the guard panel 15 is structurally independent from the protective plate 10 and the position of the pins 16 can, therefore, be determined freely such that a maximum height h of the tape cassette 1 (namely, the distance between the under surface of the tape cassette 1 and a highest part of the guard panel 15) is minimized.

Figure 8:
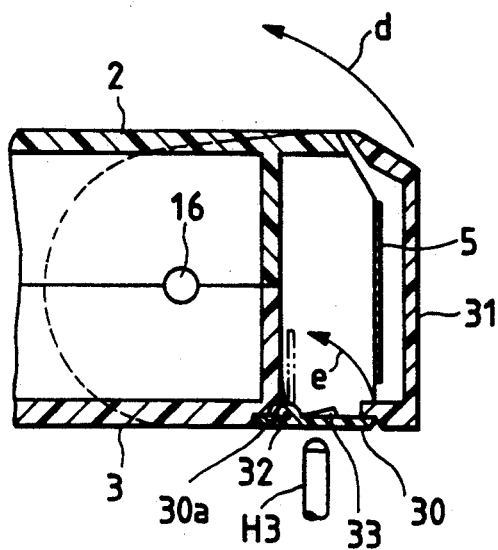
FIG. 8 is a cross-sectional view showing a portion of a magnetic tape cassette according to another embodiment of this invention.

FIG. 8 shows a portion of a modified magnetic tape cassette according to the present invention. The modified tape cassette differs from the tape cassette 1 of the foregoing embodiment shown in FIGS. 1 through 7 in that a protective plate 30 is pivotally connected or hinged to the lower edge of a lower shell 3 by means of a pair of pins 32 (only one shown). The protective plate 30 is urged clockwise about the pins 32 by means of a pair of torsion coil springs 33 (only one shown). The clockwise movement of the protective plate 30 is limited by a stopper fin 30a which is integrally formed with the proximal end edge of the protective plate 30 and extends in the same plane as the protective plate 30. The stopper fin 30a normally engages a portion of the lower shell 3 to hold the protective plate 30 in a horizontal recumbent position indicated by the solid lines. In this recumbent position, the distal end edge of the protective plate 30 is retained on an outer surface of the lower end edge of a guard panel 31 so as to enclose the magnetic tape 5. After the guard panel 31 is turned in the counterclockwise direction indicated by the arrow d by means of an actuating means (not shown), a lift pin H3 provided on a holder (not shown but similar to the holder H shown in FIG. 4) turns the protective plate 30 in the counterclockwise direction indicated by the arrow e into a vertical upstanding position indicated by the phantom lines, against the force of torsion springs 33. A segment of the magnetic tape 5 is thus exposed.

Figure 9:
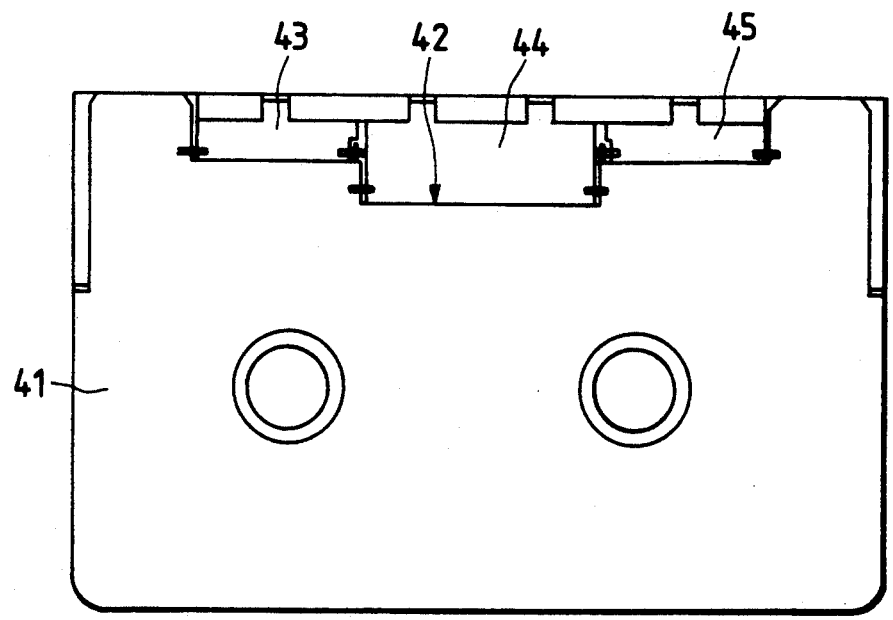
FIG. 9 is a bottom view of a magnetic tape cassette according to a further embodiment of this invention.

FIG. 9 is a bottom view of a magnetic tape cassette according to a further embodiment of this invention. The tape cassette includes a lower shell 41 having an elongate step-like (or flattened T-shaped) recessed portion or mouth 42 extending along a front side of the tape cassette, and three separate protective plate members 43, 44, 45 pinned in juxtaposition to a lower front edge of the lower shell 3. The separate protective plate members 43–45 are shorter than a single protective plate member 10 such as shown in FIG. 2(a) and independently movable so that they are highly resistant to bending force and deformation. Such split-type protective plate is particularly effective when used with a mouth having a relatively large area.

As described above, a segment of the magnetic tape extending across the front side of a tape cassette is enclosed by and between a guard panel pivotally mounted on the tape cassette to normally close the front side of the tape cassette, and a protective plate pivotally mounted on a lower shell of the tape cassette behind the guard panel. The magnetic tape can, therefore, be protected against damage before it is loaded in a magnetic recording and/or reproducing apparatus such as a video tape recorder. The protective plate which is pinned or hinged to the lower shell of the tape cassette is simple in construction and does not increase the operational height of the tape cassette when the guard panel is open. In addition, the guard panel is locked in the closed position solely by the protective plate without the necessity of additional components such as a lock lever and a torsion coil spring which are required in the conventional tape cassette. The tape cassette of this invention is, therefore, composed of a smaller number of components than the conventional tape cassette and simpler in construction than the conventional tape cassette.

Obviously, various minor changes and modifications of the present invention are possible in the light of the above teaching. It is therefore to be understood that within the scope of the appended claims the invention may be practiced otherwise than as specifically described.

What is claimed is:

1. A magnetic tape cassette of a type having an upper shell and a lower shell assembled together to hold therein a magnetic tape wound on a pair of tape reels, and a guard panel provided on a front side of the tape cassette for enclosing a segment of the tape extending along the front side of the tape cassette, the guard panel being pivotally movable between an open position in which the tape segment is exposed, and a closed position in which the tape segment is enclosed in said tape cassette between the front side and said guard panel, said guard panel being normally disposed in the closed position, wherein the improvement comprises:

(a) an elongate mouth provided in said lower shell along said front side of said tape cassette for receiving therein a loading pole for withdrawing the segment of the magnetic tape from said tape cassette; and (b) an elongate protective plate pivotally mounted on said lower shell behind said guard panel so as to be operationally movably independent of said guard panel, said protective plate extending longitudinally along said elongate mouth and being cooperative with said guard panel to enclose the segment of the magnetic tape for protecting the latter against damage, wherein said protective plate is composed of a plurality of protective plate members disposed in juxtaposition along said mouth and movable independently from one another.

2. A magnetic tape cassette according to claim 1, wherein each of said protective plate members has opposite ends pinned to said lower shell.

3. A magnetic tape cassette according to claim 1, wherein said protective plate members are pivotally movable within said mouth.

4. A magnetic tape cassette according to claim 1, wherein said guard panel has a first axis of rotation and each of said protective plate members has a second axis of rotation disposed out of alignment with said first axis of rotation.

5. A magnetic tape cassette according to claim 1, wherein each of said protective plate members is pivotally connected to said lower shell at a lower end edge thereof and has a distal end held in contact with an outer surface of a lower end edge of said guard panel when said guard panel is disposed in said closed position.

6. A magnetic tape cassette according to claim 5, wherein each of said protective plate members has a proximal end edge remote from said distal end and a stopper fin integral with said proximal end edge, said stopper fin being engageable with a portion of said lower shell to hold said each protective plate member in said closed position.

7. A magnetic tape cassette according to claim 1, wherein said protective plate has at least one locking projection at said distal end, said locking projection being lockingly engageable with said locking step of said guard panel.

8. A magnetic tape cassette according to claim 9 wherein said locking step is tapered toward said front end.

9. A magnetic tape cassette of a type having an upper shell and a lower shell assembled together to hold therein a magnetic tape wound on a pair of tape reels, and a guard panel provided on a front side of the tape cassette for enclosing a segment of the tape extending along the front side of the tape cassette, the guard panel being pivotally movable between an open position in which the tape segment is exposed, and a closed position in which the tape segment is enclosed in said tape cassette between the front side and said guard panel, said guard panel being normally disposed in the closed position, wherein the improvement comprises:

(a) an elongate mouth provided in said lower shell along said front side of said tape cassette for receiving therein a loading pole for withdrawing the segment of the magnetic tape from said tape cassette; and (b) a protective plate pivotally mounted on said lower shell behind said guard panel to extend longitudinally along the mouth and being arranged to lockingly engage with the guard panel to hold the same in the closed position against displacement to protect the segment of the magnetic tape, wherein said protective plate is composed of a plurality of protective plate members disposed in juxtaposition along said mouth and movable independently from one another.

* * * * *